United States Patent [19]
Marcu

[11] Patent Number: 5,636,946
[45] Date of Patent: Jun. 10, 1997

[54] ARTICULATED TUBE CONTAINER WITH TUBE BOGIES SYSTEM

[76] Inventor: M. I. Marcu, 97 Thorndale Crescent, Hamilton, Ontario, Canada, L8S 3K3

[21] Appl. No.: 522,563

[22] Filed: Sep. 1, 1995

[30] Foreign Application Priority Data

Sep. 1, 1994 [CA] Canada .................................. 2117657

[51] Int. Cl.⁶ .................................................. B65G 51/04
[52] U.S. Cl. .......................................................... 406/185
[58] Field of Search ............................................. 406/185

[56] References Cited

U.S. PATENT DOCUMENTS 3,921,533  11/1975  Szenasi et al. ......................... 406/185
4,113,202   9/1978  Ueno .................................... 406/185

FOREIGN PATENT DOCUMENTS 1558828   4/1990  U.S.S.R. .............................. 406/185
1299059  12/1972  United Kingdom ................... 406/185

Primary Examiner—Gary C. Hoge

[57] ABSTRACT

A tube container for tubular transport is proposed made of a gondola which is supported via articulations at each end on tube bogies, the articulations having 3 degrees of rotational freedom permitting the gondola to rotate around its axis and the bogies to take the proper rolling attitude in the tube, to negotiate curves, the tube bogies having wheels able to cope and roll on the tube rolling surface, and the gondola having a pendular follower which can be extracted out by a magnetic extractor from the gondola space and the pendular follower being used for unloading the gondola in motion with the help of a helical stationary cam acting on the said follower.

1 Claim, 12 Drawing Sheets

ARTICULATED TUBE CONTAINER WITH TUBE BOGIES SYSTEM

BACKGROUND OF THE INVENTION

1. Field of the Invention

The invention relates to tube vehicles for pneumatic transport in large tubes. More particularly the invention relates to containers for tube transport by pneumatic propulsion having bogies in front and in the back.

2. Description of the Prior Art

There are known containers for tube transport, a typical one being the one presented in U.S. Pat. No. 3,734,428. These containers have fixed assemblies of wheels and are unable to negotiate tight tube curves as well as they have large contact area at the wheels, generating friction in the contact print because the rolling contact is curved.

SUMMARY OF THE INVENTION

In aim to eliminate the above disadvantages an articulated tube container with tube bogies system is proposed involving the following:

- a tubular guide way in form of a tube hereinafter called "the tube", having a top part and a bottom part and having an axis of symmetry,
- a tubular guide way cut at the bottom part resulted from a tube having the same diameter as the tubular guide way,
- a gondola in form of a cylindrical pontoon having a top part and a bottom part and being cut at the top part and having a front and a back and an axis of symmetry parallel with the tube,
- the said gondola having in front and in the back articulations in form of bushings with one degree of rotational freedom, these bushings having the same axis and this axis being parallel with the tube and contained in the same vertical plane as the axis of the tube and which is parallel with the axis of symmetry of the gondola,
- the gondola having the bottom flat,
- on the bushings being fixed a rigid object called the stopping finger, the bushings being part of the gondola, that is if gondola is rotating around the axis of the bushings, then these bushings are rotating together with it and the stopping finger also,
- on the said gondola there are articulated, via articulations with one degree of rotational freedom and with the axis of rotation parallel with the axis of rotation parallel with the axis of gondola a pendular follower in form of a lever having at one end a roller,
- the pendular follower being placed in the front of the gondola,
- in the front of the gondola there is welded/fixed a stopper,
- the pendular follower has a little arm, and when the pendular follower is rotating the little arm is stopped in the stopper,
- on the front of the gondola there is fixed an adjustable spring and this spring is supporting the pendular follower,
- also the tube container has tube bogies involving tube wheels,
- the tube bogies are made of a frame which is a rigid object called the bogie frame,
- whereby, articulated to the frame there are shaft assemblies
- the tube wheels are articulated to the shaft assemblies,
- the shaft assemblies are made in form of a main shaft which is a rigid object, and welded to it right and left, journal shafts one in each side, the main shaft and the journal shafts having all of them axes of symmetry, and these axes of symmetry are contained in a plane perpendicular on the axis of the main shaft, and the axes of symmetry of the journal shafts are intersecting together in the centre of gravity of the main shaft,
- the said tube wheels are placed on the journal shafts and able to rotate free on them,
- the assemblies made of the main shafts with journal shafts and the free rotating tube wheels are placed in bushings placed on the rigid frame, the axes of these bushings being parallel with the axis of the tubular guide way, these bushings being hereinafter called frame bushings,
- the assembly made of the main shafts with journal shafts and the free rotating tube wheels being put into the frame bushings and being able to rotate in these bushings,
- the tube wheels, placed in the bushings placed on the rigid frame of the tube bogies are touching the tube when the bogies are put in the tube and the planes of rotation of the wheels intersect the symmetry axis of the tube,
- whereby in case of a tube bogie with 4 pairs of tube wheels, these pairs will be simply free to oscillate around their main shaft in the frame bushings and therefore to cope with the tube surface, their rotation planes—this time 8 of them intersecting in the axis of the tube,
- on the rigid bogie frame being welded or fixed a support which is a rigid plate and on this support is an articulation with one degree of rotational freedom that is a bushing and a shaft, the shaft being fixed to the support, the axis of the shaft being perpendicular on the vertical plane passing through the axis of symmetry of the tubular guide way,
- the system having also a vertical bushing, fixed on the articulation, that is being placed in such a way that its axis to intersect the centre of gravity of the articulation and to be perpendicular on it, and the axis of the vertical bushing being contained in the vertical plane passing through the axis of the tubular guide way,
- the system having a connecting shaft and this shaft having one end articulated to the vertical bushing and the other end articulated to the bushing in front or in the back of the gondolas,
- the connecting shaft having the following form: a straight part entering in the bushing in front/back of the gondolas, then after this part continued vertically in a straight line with a vertical part, this vertical part being perpendicular on the straight part, the vertical part having on it a gondola stopper in form of a bar welded to the vertical part placed in such a position that to be able to stop the rotation of the gondola more than 180 degrees by the stopping finger which has to stop in the gondola stopper when the gondola is rotated 180 degrees, then the vertical part is continued with a horizontal part perpendicular on the vertical part, and then continued with the terminal vertical part which is perpendicular on the horizontal part, all these parts of the connecting shaft having their axes contained in the same plane, which is vertical when the container is rolling on the tube in straight line, and is coinciding with the vertical plane of symmetry of the tubular guide way, whereby the terminal vertical part is entering in the vertical bushing, the system has also a magnetic extractor in form of a magnetic bar having a spatial form generated by the movement of the container and the rotation of the pendular follower, the magnetic extractor being in fact a cam like or ribbon like structure, being able to touch the roller of the pendular follower as the container is advancing, then by magnetic force to exert a force on it and to extract it from the container, the pendular follower in totally extracted position, rotated by the magnetic extractor, is stopped in the stopper, the pendular follower is adjusted as position by the adjustable spring so that to be close to the magnetic extractor when the container is passing near of it, a helical cam for unloading the container called the unloading cam, the magnetic extractor being in form of a prismatic plate, at one end being with the face vertical and on the other end being with the face horizontal, the transition being generated by the movement of the container and the subsequent rotation of the pendular follower in such a way that when the container is moving along the tubular guide way, thew follower will do an extraction movement, getting out of the container space and rolling on the magnetic extractor, ready to engage in the helical cam, whereby when the pendular follower is extracted and maintained in the extracted position, limited by the stopper, then the pendular follower is able to enter in the unloading helical cam and to determine the rotation of the gondola around the axis of the bushings in front and in the back, whereby the arrangements of the bushings and connecting shaft permit the container and the bogie to be free to negotiate any curve and the bogie is free to orient itself in the tube in the optimal rolling position, whereby the centre of intersection of the planes of the wheels is above the centre of rotation of the gondola in the bushings in front and in the back of the gondola and the centre of gravity when the container is unloaded or loaded is below the centre of rotation—this for stability in moving—to avoid the container "to come with the head down and legs up" in the tube, on the bogie flame being a rigid disk and on this disk being a flexible gasket made of rubber or similar material, the flexible gasket almost touching the tube, the rigid disk being placed in the middle of the bogie frame and the plane of the disk being perpendicular on the axis of the tubular guide way, the system has cleaning elements made of polyurethane or made in form of a brush with polyester bristles, the cleaning element being placed in front of the wheels to clean the tube before the wheels, whereby the cleaning elements are almost touching the tube, journal shaft stoppers in form of rigid objects welded to the bogie frame in such a way that to limit the rotation of the assembly made of the wheels and their associated shafts, that is limiting the rotation up or down of the assembly but letting the assembly however to oscillate a little that is to be able to cope perfectly with the inner surface of the tube or if the container is supported only by the wheels placed at the exterior, then the stoppers to limit the said rotation to go beyond a certain point, also the system involving a tubular guide way cut at the bottom so that only the exterior wheels could be supported by the remaining of the tubular guide way, also the system involving for very sharp curves a tubular guide way cut laterally in such a way that the exterior wheels of the tube bogies are no more on the tube and the body of the gondola is able to move in a plan parallel motion associated with the curve motion and to get out of the tubular guide way without touching it, meanwhile the tube bogies remaining on the tube and continuing to roll—by this it is possible to have very small radiuses for transferring the containers from one tube to another at the ends, the system involving lateral supporting rollers placed close to the returning loops to support the body of the gondola when this is getting out of the tubular guide way at the tight curve configurations, these supporting rollers being placed in a circle if the radius is constant and the plane containing their centres of gravity intersecting the axis of the gondola and this plane being horizontal, whereby the tube bogies and the tube gondolas could be arranged in a succession like a train so that to have a tube bogie, then a tube gondola, then a tube bogie again and so on therefore being possible to have a train configuration, The way of operation of the system is as follows:

In cruise mode, the bogies simply are rolling on the tube being centred because of the fact that the centre of gravity is below the centre of intersection and rotation; the gaskets are assuring the pneumatic propulsion; then at the unloading area, the tube is cut in such a way that the external wheels remain on the tube but the internal ones are simply in air, the stoppers limit the rotation of the wheel assemblies and the space between the wheels is free for permitting unloading; then when the container is close to the magnetic extractor, the pendular follower is extracted out and is engaged in the helical unloading cam, by this doing a rotation of the gondola, and hence unloading the material from the gondola, meantime the cleaning elements cleaning the path in front of the wheels if some spillage is happening on the track; and when the container is engaged in a very tight curve, then the tube is cut in such a way that will allow the gondola to move laterally in curve and not touching the tube, this because of the flat bottom configuration of the gondola and because the cut tube is not touching the bottom of the gondola; also it is possible to arrange the curve in such a way that to support the container in curve motion by supporting rollers, increasing the stability of the curve negotiation process; all the time the pressure exercised by the weight of the container is applied in the rolling surface of the wheels and hence the container is stable from static point of view; also it is possible to have trains organized with a succession of tube bogies and tube gondolas.

Advantages of the System

The system has the following advantages:

decreasing the width of the rolling wheel in half compared with the traditional solution (2" instead of 4"), increasing the curve negotiation capability particularly in tight curves, simplifying the unloading and making it totally dynamic

BRIEF DESCRIPTION OF THE DRAWINGS

Below is given and example of the application of the invention in connection with the following figures.

DESCRIPTION OF THE PROFFERED EMBODIMENTS

Figure 1:
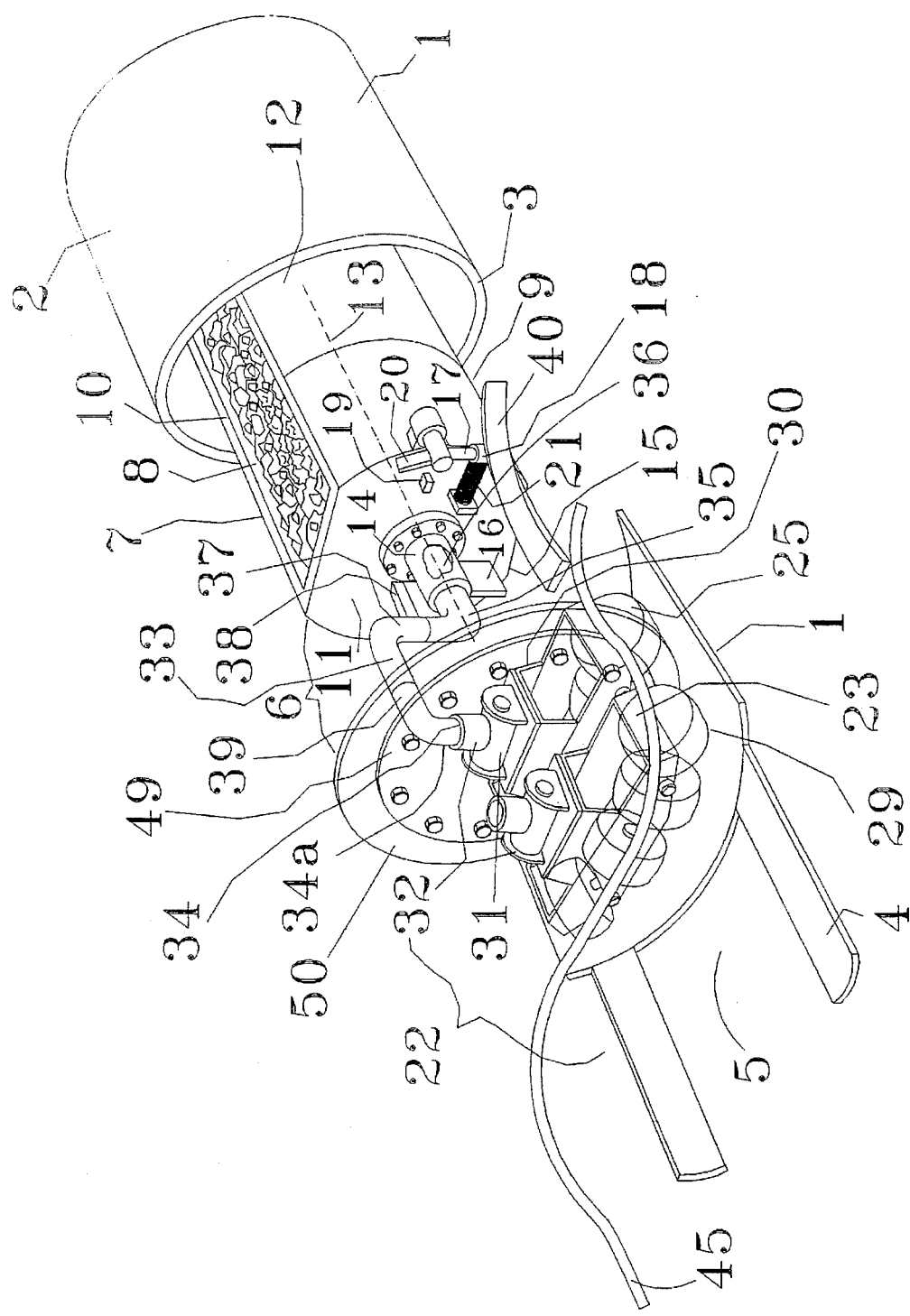
FIG. 1—Perspective view—tube container/bogie
Figure 2:
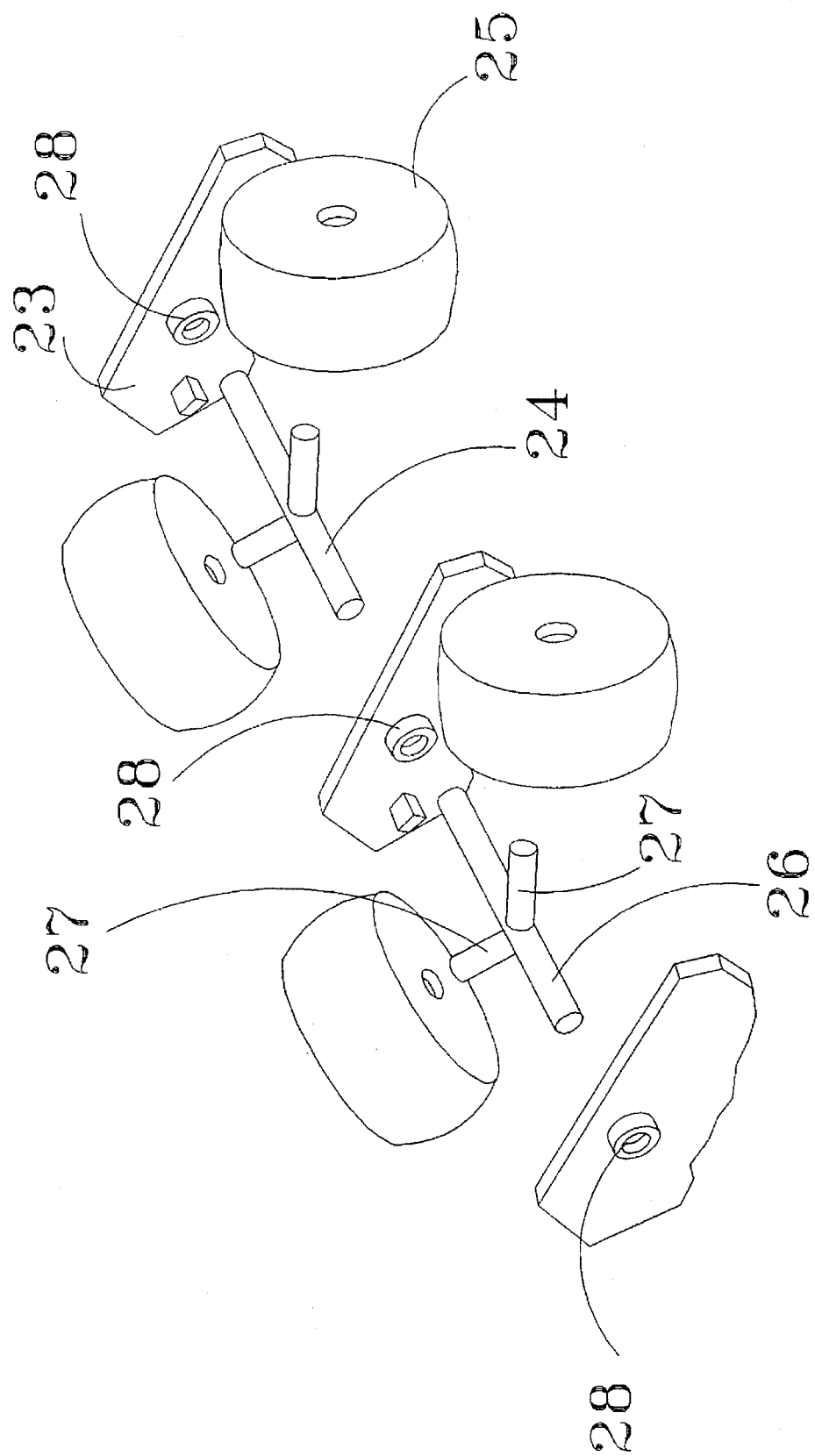
FIG. 2—Perspective view bogie structure
Figure 3:
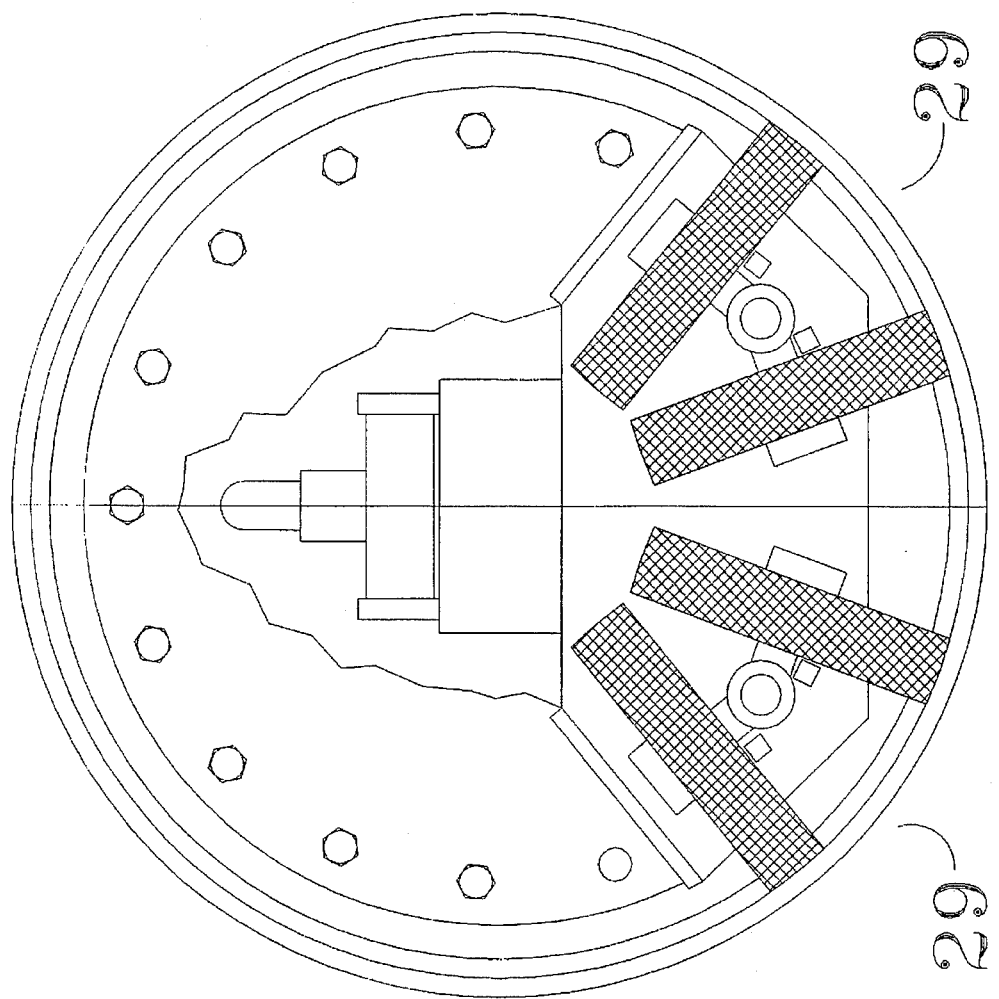
FIG. 3—Container section
Figure 4:
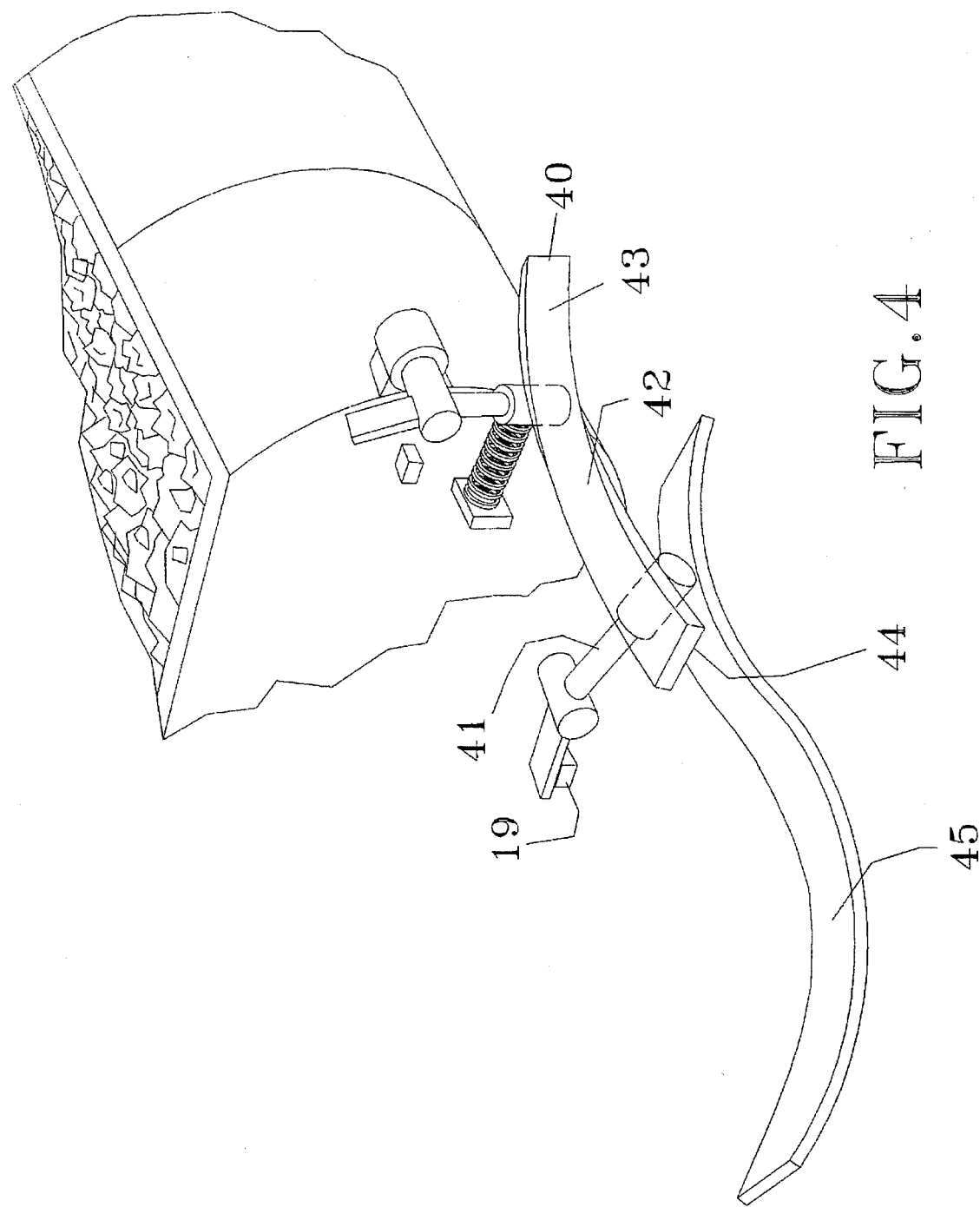
FIG. 4—Perspective view magnetic extractor/helical unloading cam operation
Figure 5:
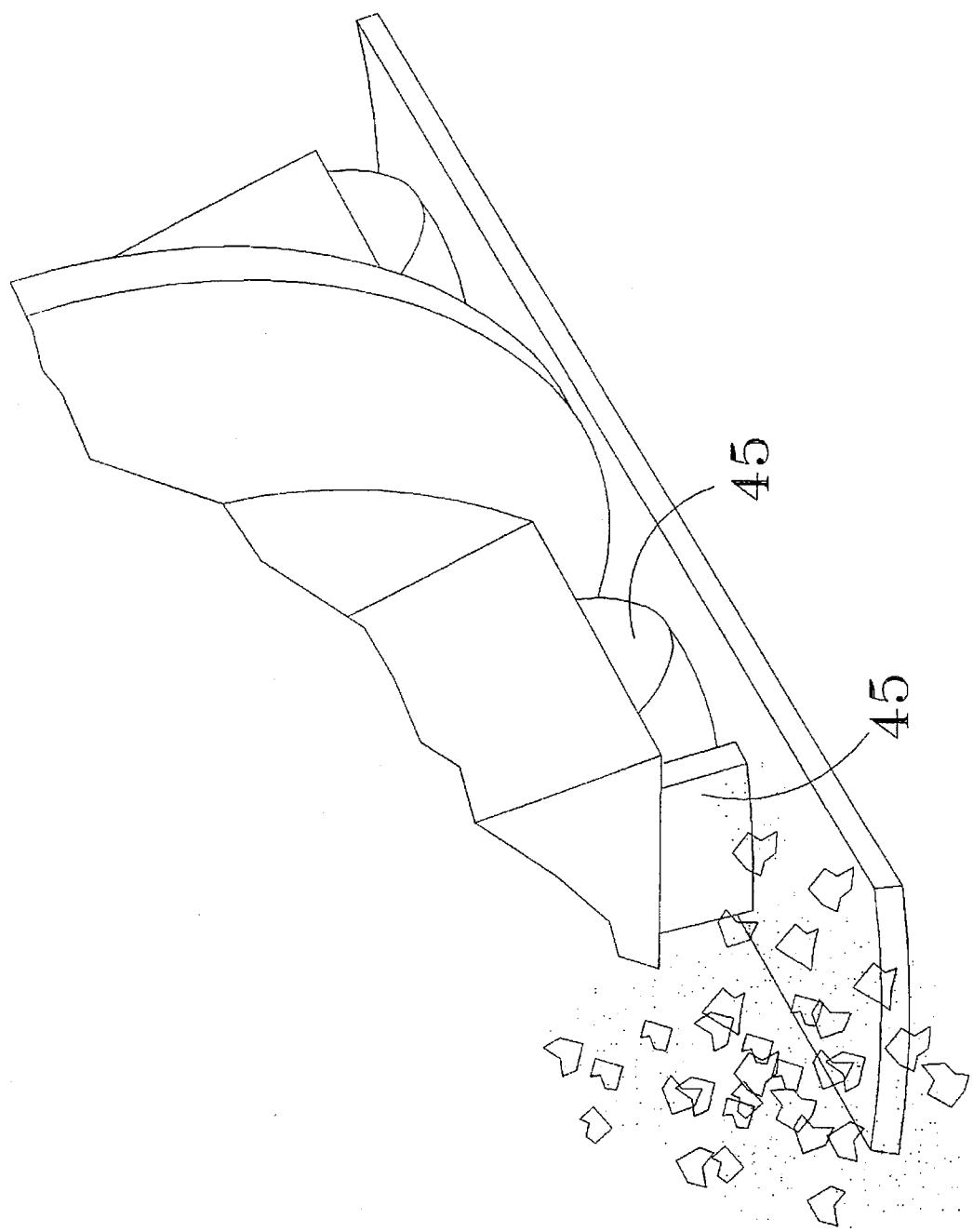
FIG. 5—Perspective view operation of the cleaning element in front of the wheel
Figure 6:
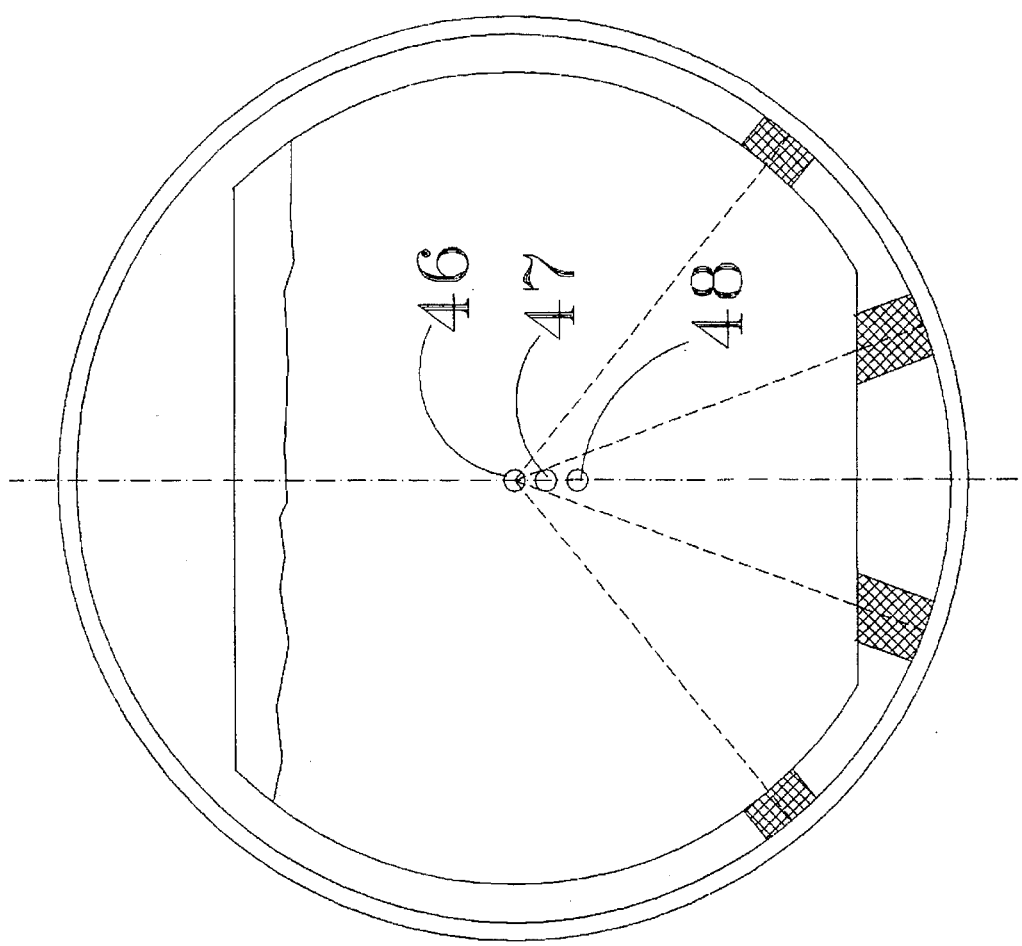
FIG. 6—Diagram—the relation between the centre of intersection, rotation and gravity FIG. 7—Diagram—unloading process FIG. 8—Diagram-curve negotiating process FIG. 9—Perspective view helical cam operation and finger stopper operation FIG. 10—Perspective view curve process FIG. 11—Perspective view curve process with supporting rollers FIG. 12—Perspective view—train arrangement
Figure 7:
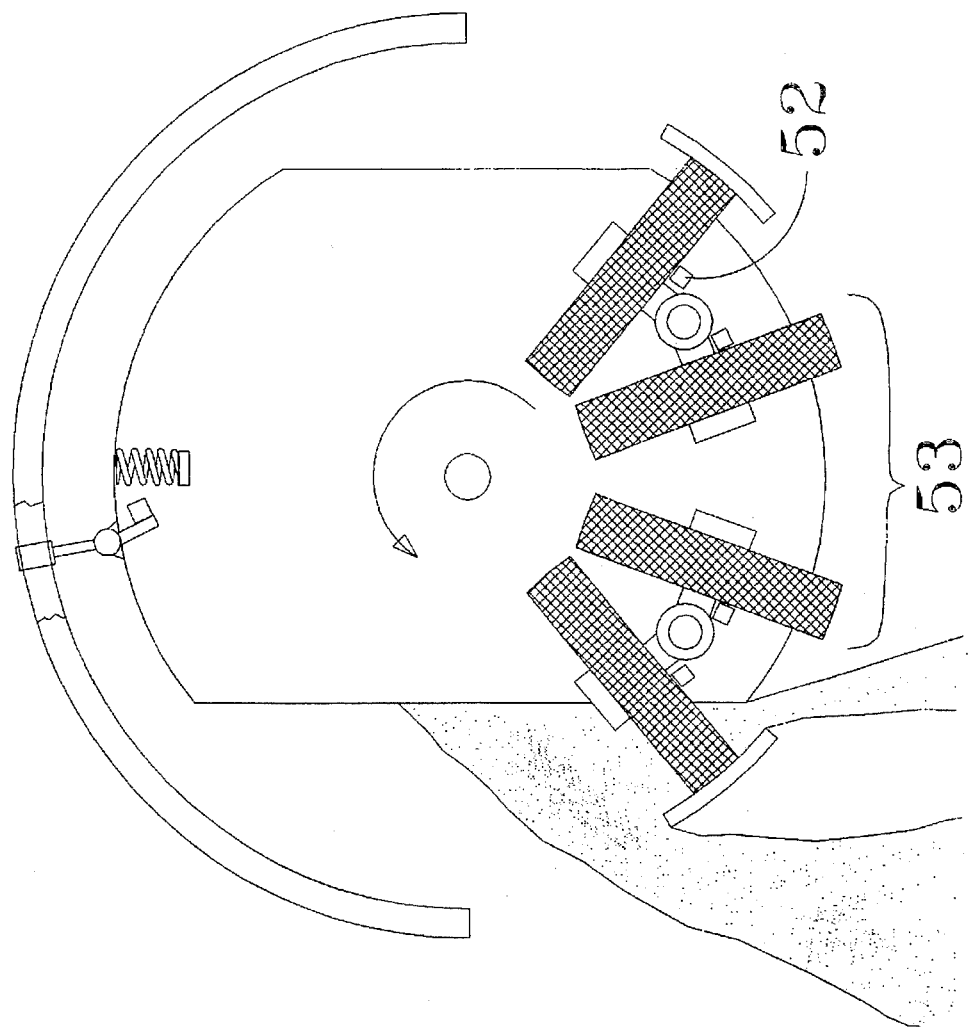
Figure 8:
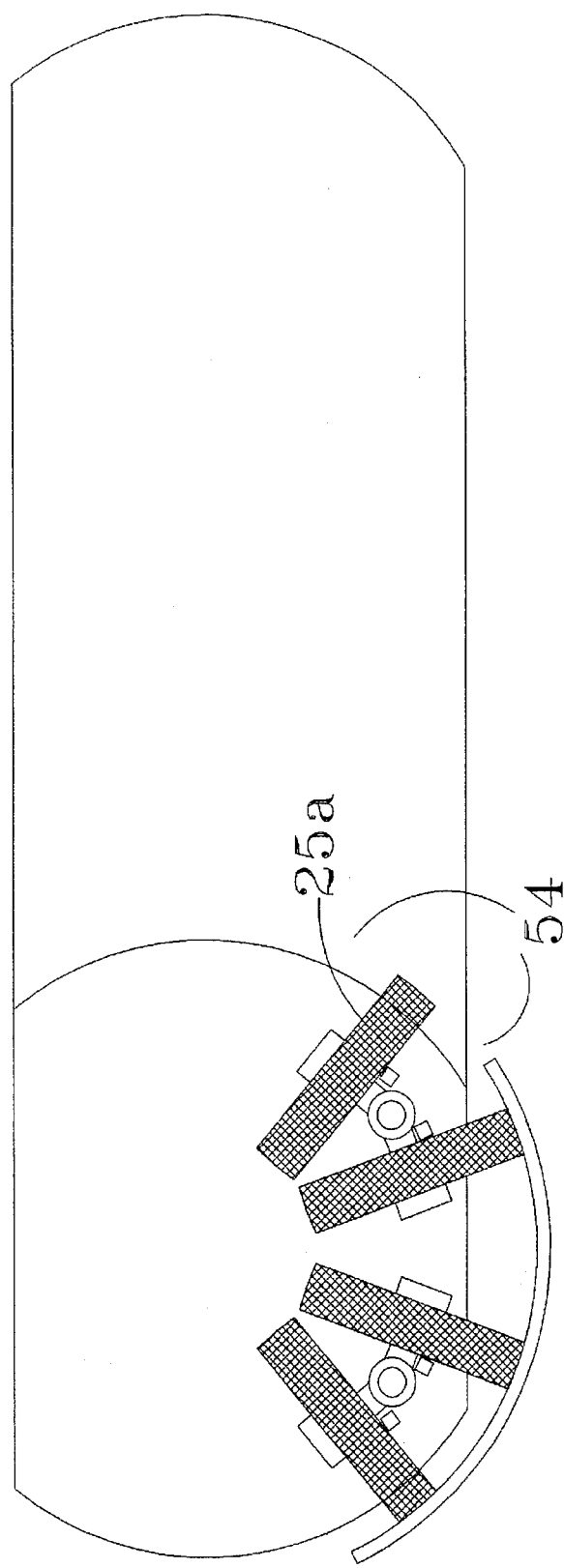
Figure 9:
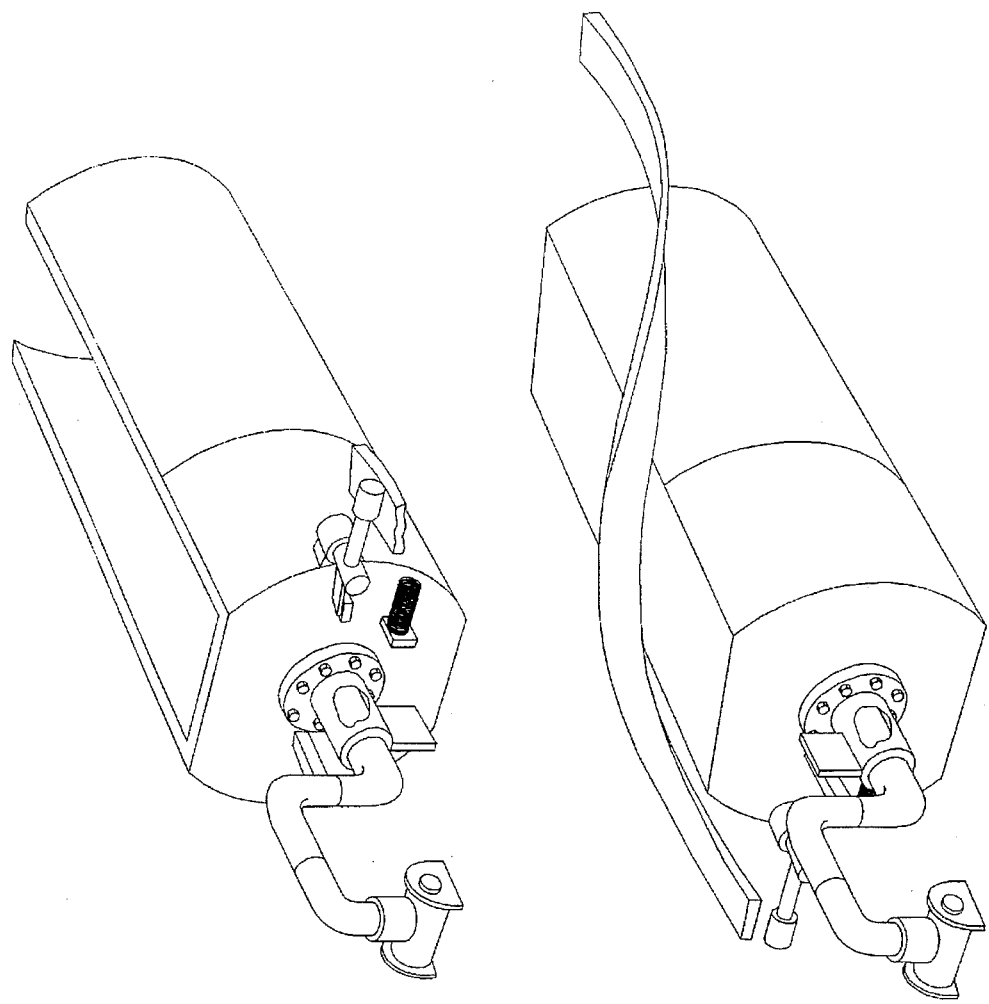
Figure 10:
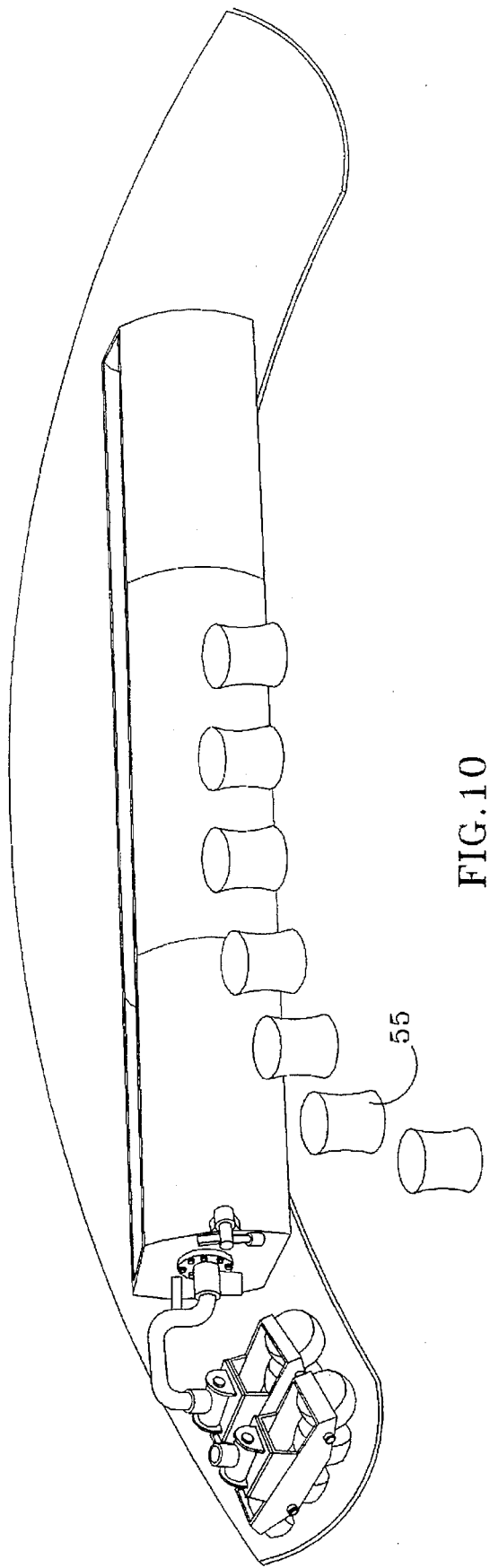
Figure 11:
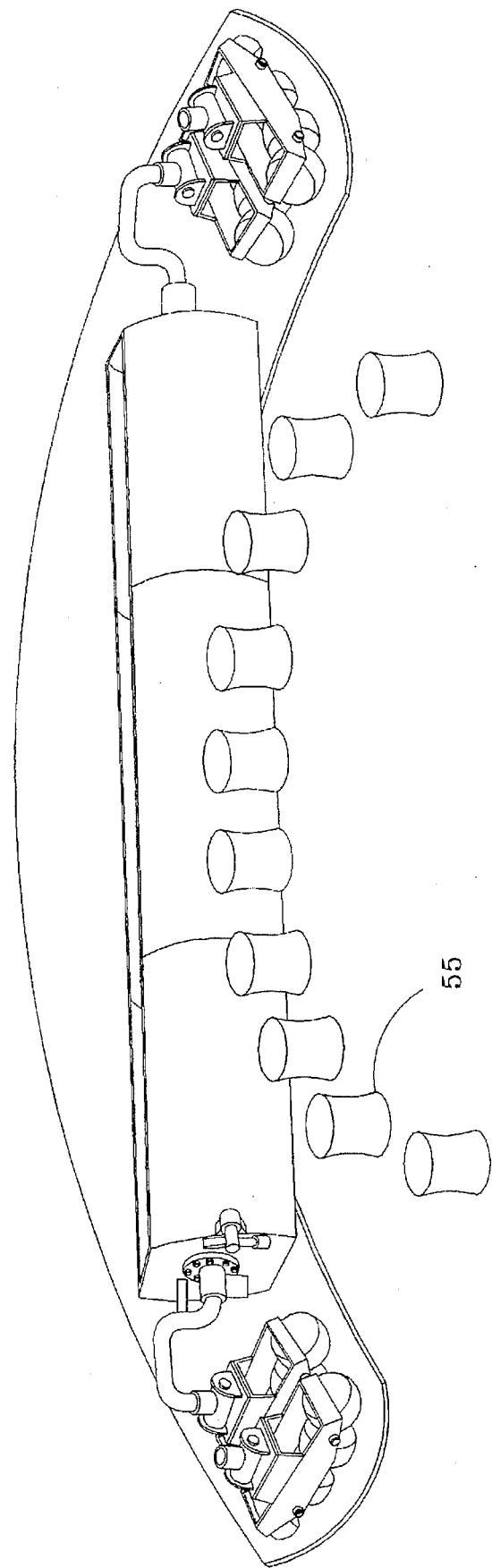
Figure 12:
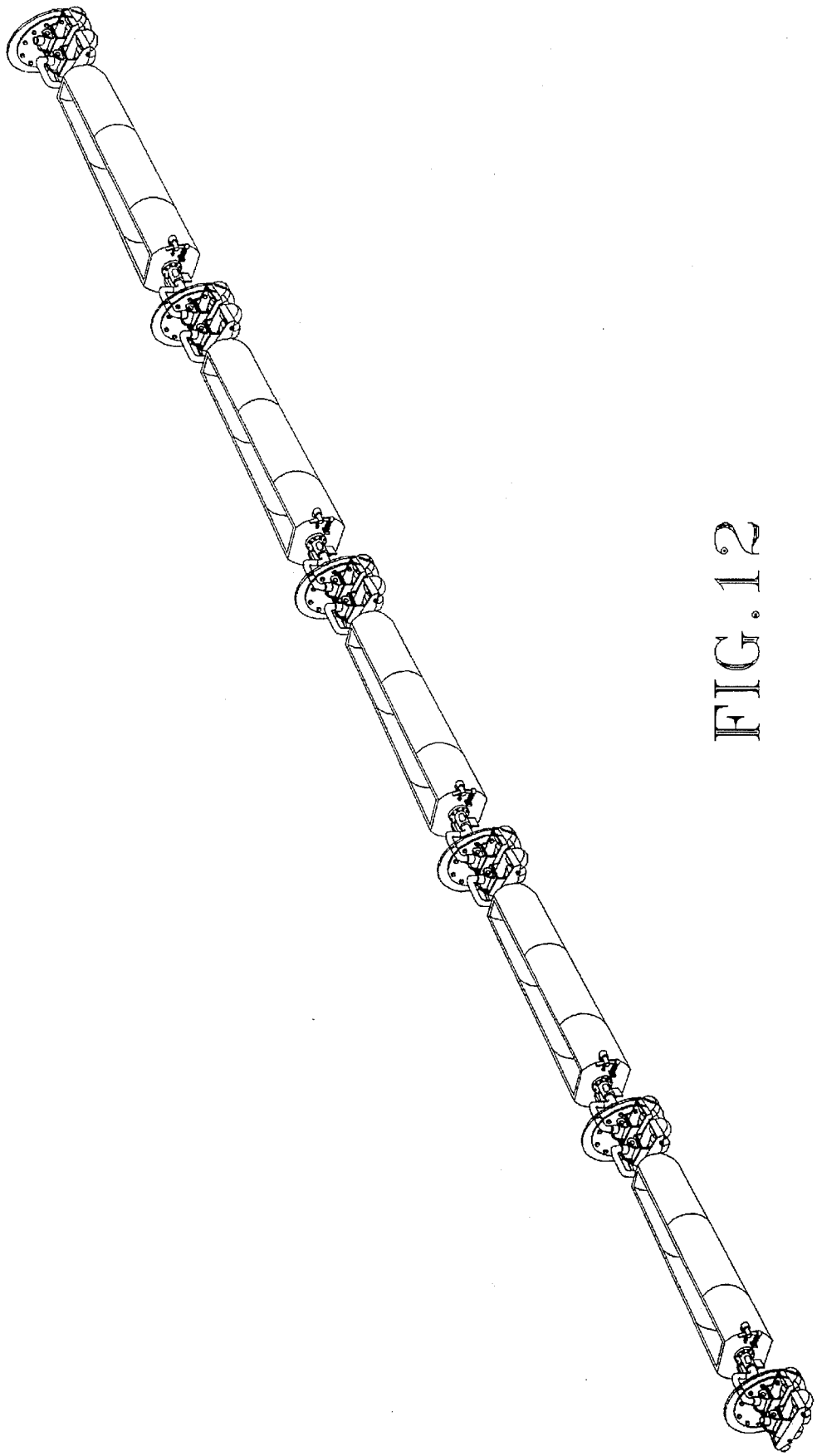

As is seen in the illustrations the system is made or is involving the following:

- a tubular guide way 1 in form of a tube hereinafter called "the tube", having a top part 2 and a bottom part 3 and having an axis of symmetry,
- a tubular guide way 4 cut at the bottom part 5 resulted from a tube having the same diameter as the tubular guide way,
- a gondola 6 in form of a cylindrical pontoon 7 having a top part 8 and a bottom part 9 and being cut at the top part 10 and having a front 11 and a back 12 and an axis of symmetry 13 parallel with the tube,
- the said gondola having in front and in the back articulations in form of bushings 14 with one degree of rotational freedom, these bushings having the same axis and this axis being parallel with the tube and contained in the same vertical plane as the axis of the tube and which is parallel with the axis of symmetry of the gondola,
- the gondola having the bottom 15 flat,
- on the bushings being fixed a rigid object 16 called the stopping finger, the bushings being part of the gondola, that is if gondola is rotating around the axis of the bushings, then these bushings are rotating together with it and the stopping finger also,
- on the said gondola there are articulated, via articulations with one degree of rotational freedom and with the axis of rotation parallel with the axis of rotation parallel with the axis of gondola a pendular follower 17 in form of a lever having at one end a roller 18,
- the pendular follower being placed in the front of the gondola,
- in the front of the gondola there is welded/fixed a stopper 19,
- the pendular follower has a little arm 20, and when the pendular follower is rotating the little arm is stopped in the stopper,
- on the front of the gondola there is fixed an adjustable spring 21 and this spring is supporting the pendular follower,
- also the tube container has tube bogies 22 involving tube wheels,
- the tube bogies are made of a frame 23 which is a rigid object called the bogie frame,
- whereby, articulated to the frame there are shaft assemblies 24,
- the tube wheels 25 are articulated to the shaft assemblies,
- the shaft assemblies are made in form of a main shaft 26 which is a rigid object, and welded to it right and left, journal shafts 27 one in each side, the main shaft and the journal shafts having all of them axes of symmetry, and these axes of symmetry are contained in a plane perpendicular on the axis of the main shaft, and the axes of symmetry of the journal shafts are intersecting together in the centre of gravity of the main shaft,
- the said tube wheels are placed on the journal shafts and able to rotate free on them,
- the assemblies made of the main shafts with journal shafts and the free rotating tube wheels are placed in bushings 28 placed on the rigid frame, the axes of these bushings being parallel with the axis of the tubular guide way, these bushings being hereinafter called frame bushings,
- the assembly made of the main shafts with journal shafts and the free rotating tube wheels being put into the frame bushings and being able to rotate in these bushings,
- the tube wheels, placed in the bushings placed on the rigid frame of the tube bogies are touching the tube 29 when the bogies are put in the tube and the planes of rotation of the wheels intersect the symmetry axis of the tube,
- whereby in case of a tube bogie with 4 pairs of tube wheels, these pairs will be simply free to oscillate around their main shaft in the frame bushings and therefore to cope with the tube surface, their rotation planes—this time 8 of them intersecting in the axis of the tube,
- on the rigid bogie frame being welded or fixed a support 30 which is a rigid plate and on this support is an articulation 31 with one degree of rotational freedom that is a bushing and a shaft, the shaft being fixed to the support, the axis of the shaft being perpendicular on the vertical plane passing through the axis of symmetry of the tubular guide way,
- the system having also a vertical bushing 32, fixed on the articulation, that is being placed in such a way that its axis to intersect the centre of gravity of the articulation and to be perpendicular on it, and the axis of the vertical bushing being contained in the vertical plane passing through the axis of the tubular guide way,
- the system having a connecting shaft 33 and this shaft having one 34 end articulated to the vertical bushing and the other end 35 articulated to the bushing in front or in the back of the gondolas,
- the connecting shaft having the following form: a straight part 36 entering in the bushing in front/back of the gondolas, then after this part continued vertically in a straight line with a vertical part 37, this vertical part being perpendicular on the straight part, the vertical part having on it a gondola stopper 38 in form of a bar welded to the vertical part placed in such a position that to be able to stop the rotation of the gondola more than 180 degrees by the stopping finger 16 which has to stop in the gondola stopper when the gondola is rotated 180 degrees, then the vertical part is continued with a horizontal part 39 perpendicular on the vertical part, and then continued with the terminal vertical part 34a which is perpendicular on the horizontal part, all these parts of the connecting shaft having their axes contained in the same plane, which is vertical when the container is rolling on the tube in straight line, and is coinciding with the vertical plane of symmetry of the tubular guide way, whereby the terminal vertical part is entering in the vertical bushing, the system has also a magnetic extractor 40 in form of a magnetic bar having a spatial form generated by the movement of the container and the rotation of the pendular follower, the magnetic extractor being in fact a cam like or ribbon like structure, being able to touch the roller 18 of the pendular follower as the container is advancing, then by magnetic force to exert a force on it and to extract it from the container, the pendular follower in totally extracted position 41, rotated by the magnetic extractor, is stopped in the stopper 19, the pendular follower is adjusted as position by the adjustable spring so that to be close to the magnetic extractor when the container is passing near of it, a helical cam 45 for unloading the container called the unloading cam, the magnetic extractor being in form of a prismatic plate 42, at one end being with the face 43 vertical and on the other end being with the face 44 horizontal, the transition being generated by the movement of the container and the subsequent rotation of the pendular follower in such a way that when the container is moving along the tubular guide way, thew follower will do an extraction movement, getting out of the container space and rolling on the magnetic extractor, ready to engage in the helical cam 45, whereby when the pendular follower is extracted and maintained in the extracted position, limited by the stopper, then the pendular follower is able to enter in the unloading helical cam and to determine the rotation of the gondola around the axis of the bushings in front and in the back, whereby the arrangements of the bushings and connecting shaft permit the container and the bogie to be free to negotiate any curve and the bogie is free to orient itself in the tube in the optimal rolling position, whereby the centre of intersection 46 of the planes of the wheels is above the centre of rotation 47 of the gondola in the bushings in front and in the back of the gondola and the centre of gravity 48 when the container is unloaded or loaded is below the centre of rotation—this for stability in moving—to avoid the container "to come with the head down and legs up" in the tube, on the bogie frame being a rigid disk 49 and on this disk being a flexible gasket 50 made of rubber or similar material, the flexible gasket almost touching the tube 1, the rigid disk being placed in the middle of the bogie frame and the plane of the disk being perpendicular on the axis of the tubular guide way, the system has cleaning elements 51 made of polyurethane or made in form of a brush with polyester bristles, the cleaning element being placed in from of the wheels 25 to clean the tube before the wheels, whereby the cleaning elements are almost touching the tube, journal shaft stoppers 52 in form of rigid objects welded to the bogie frame in such a way that to limit the rotation of the assembly made of the wheels and their associated shafts, that is limiting the rotation up or down of the assembly but letting the assembly however to oscillate a little that is to be able to cope perfectly with the inner surface of the tube or if the container is supported only by the wheels placed at the exterior, then the stoppers to limit the said rotation to go beyond a certain point, also the system involving a tubular guide way cut at the bottom 53 so that only the exterior wheels could be supported by the remaining of the tubular guide way (see FIG. 7), also the system involving for very sharp curves a tubular guide way cut laterally 54 in such a way that the exterior wheels 25a of the tube bogies are no more on the tube and the body of the gondola is able to move in a plan parallel motion associated with the curve motion and to get out of the tubular guide way without touching it, meanwhile the tube bogies remaining on the tube and continuing to roll—by this it is possible to have very small radiuses for transferring the containers from one tube to another at the ends (FIG. 8), the system involving lateral supporting rollers 55 placed close to the returning loops to support the body of the gondola when this is getting out of the tubular guide way at the tight curve configurations, these supporting rollers being placed in a circle if the radius is constant and the plane containing their centres of gravity intersecting the axis of the gondola and this plane being horizontal, whereby the tube bogies and the tube gondolas could be arranged in a succession like a train so that to have a tube bogie, then a tube gondola, then a tube bogie again and so on therefore being possible to have a train configuration (FIG. 12), The way of operation of the system is as follows:

In cruise mode, the bogies simply are rolling on the tube being centred because of the fact that the centre of gravity is below the centre of intersection and rotation; the gaskets are assuring the pneumatic propulsion; then at the unloading area, the tube is cut in such a way that the external wheels remain on the tube but the internal ones are simply in air, the stoppers limit the rotation of the wheel assemblies and the space between the wheels is free for permitting unloading; then when the container is close to the magnetic extractor, the pendular follower is extracted out and is engaged in the helical unloading cam, by this doing a rotation of the gondola, and hence unloading the material from the gondola, meantime the cleaning elements cleaning the path in front of the wheels if some spillage is happening on the track; and when the container is engaged in a very tight curve, then the tube is cut in such a way that will allow the gondola to move laterally in curve and not touching the tube, this because of the flat bottom configuration of the gondola and because the cut tube is not touching the bottom of the gondola; also it is possible to arrange the curve in such a way that to support the container in curve motion by supporting rollers, increasing the stability of the curve negotiation process; all the time the pressure exercised by the weight of the container is applied in the rolling surface of the wheels and hence the container is stable from static point of view; also it is possible to have trains organized with a succession of tube bogies and tube gondolas. The system has the following advantages:

decreasing the width of the rolling wheel in half compared with the traditional solution (2" instead of 4"), increasing the curve negotiation capability particularly in tight curves, simplifying the unloading and making it totally dynamic.

The embodiments of the invention in which an exclusive privilege is claimed are as follows:

1. A pneumatic transportation system comprising:
   a tubular guideway having a top portion and a bottom portion and having an axis of symmetry, an opening in the bottom part of the tubular guideway, a gondola in the form of a substantially cylindrical pontoon being open at a top portion and having a front, a back, a flat bottom portion, and an axis of symmetry parallel with that of the tubular guideway, two gondola bushings, one attached to the front thereof and the other attached to the back thereof, said gondola bushings having one degree of rotational freedom and a common bushing axis, said bushing axis being parallel with that of the tubular guideway, said gondola also having a bogie at the from and back thereof, the bogies each having a bogie frame to which are pivotally attached a plurality of shaft assemblies, each shaft assembly being pivotally supported in a frame bushing and extending parallel to the axis of symmetry of said tubular guideway, and each shaft assembly having two journal shafts attached to the midpoint thereof and extending in a direction perpendicular to the axis of symmetry of said tubular guideway, a plurality of wheels, each rotatably attached to one of said journal shafts, wherein each wheel touches said tubular guideway when said gondola is inserted therein and the planes of rotation of the wheels each intersect above the axis of said gondola bushings, a horizontal bushing attached to said bogie frame and having a horizontal axis of rotation which is perpendicular to the axis of symmetry of said tubular guideway, a vertical bushing attached to said horizontal bushing and having a vertical axis of rotation which intersects the axis of symmetry of said tubular guideway, a connecting shaft having a first end articulated to said vertical bushing and a second end articulated to one of said gondola bushings, said connecting shaft comprising a straight portion entering said gondola bushing and an inverted u-shaped portion, a distal end of which enters said vertical bushing, a rigid stopping finger attached to each of said gondola bushings, a gondola stopper attached to the vertical leg of said inverted u-shaped portion which is closest to said gondola bushing for stopping the rotation of said gondola after a predetermined arc of rotation by engaging said stopping finger, a pendular follower pivotally attached to the front of said gondola about an axis of rotation parallel with the axis of symmetry of said gondola, said pendular follower having a roller at a distal end thereof, a magnetic extractor attached to said tubular guideway, the magnetic extractor being in the form of a ribbon-like structure, whereby the roller of the pendular follower touches the magnetic extractor as the gondola is advancing and the magnetic extractor extends the pendular follower from the gondola by magnetic force, a second stopper fixed to the front of said gondola, said pendular follower including an arm for engagement with said second stopper when said pendular follower is rotated by a predetermined amount, a helical cam for unloading the gondola attached to said tubular guideway, the magnetic extractor being oriented vertically at a first end and horizontally at a second end, such that the pendular follower is dram out from a vertical initial position to a horizontal final position in order to engage the helical cam, whereby the engagement of the pendular follower with the helical cam will cause rotation of the gondola around the axis of said gondola bushings in order to dump the contents of said gondola through said opening in the bottom part of said tubular guideway, a rigid disk attached to a middle portion of each said bogie frame and including a flexible gasket which almost touches the tube, the rigid disk being oriented perpendicular to the axis of said tubular guideway.

* * * * *